United States Patent

Linnenbank

[15] 3,664,122
[45] May 23, 1972

[54] CHAIN CONNECTING LINK

[72] Inventor: Charles D. Linnenbank, Wyncroft, Media, Pa.

[73] Assignee: Baldt Anchor and Chain Corporation-a subsidiary of Baldt Corporation, Chester, Pa.

[22] Filed: Apr. 13, 1970

[21] Appl. No.: 27,764

[52] U.S. Cl....................................................59/85, 59/93
[51] Int. Cl.....................................................F16g 15/04
[58] Field of Search.....................59/85, 84, 93, 78, 86, 90; 74/251, 254

[56] References Cited

UNITED STATES PATENTS

| | | | |
|---|---|---|---|
| 2,010,124 | 8/1935 | Worrall | 74/254 |
| 245,448 | 8/1881 | Church | 59/86 |
| 1,239,232 | 9/1917 | Taylor | 59/78 |
| 1,380,903 | 6/1921 | Haughwout | 59/85 |
| 1,751,013 | 3/1930 | McMullen | 59/78 |
| 2,249,238 | 7/1941 | Gilmore | 59/93 |
| 3,014,340 | 12/1961 | Van Der Waals | 59/78 |

FOREIGN PATENTS OR APPLICATIONS

| | | | |
|---|---|---|---|
| 880,296 | 10/1961 | Great Britain | 59/85 |
| 17,599 | 12/1888 | Great Britain | 59/85 |

*Primary Examiner*—Charles W. Lanham
*Assistant Examiner*—Gene P. Crosby
*Attorney*—Cushman, Darby & Cushman

[57] ABSTRACT

A special link for use in detachably connecting links of chain and other objects to stud-link marine anchor chains. Said connecting link having a positioning member which limits the movement of said stud-link chain with respect to said connecting link so that said connecting link is prevented from damaging, weakening or dislodging the studs in said stud-link chain.

6 Claims, 2 Drawing Figures

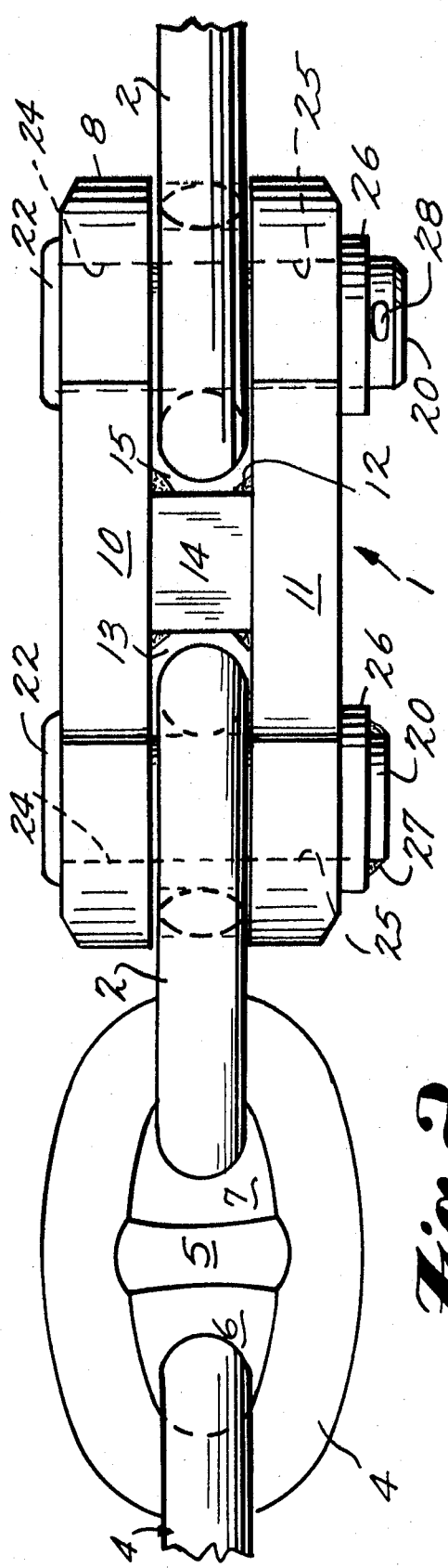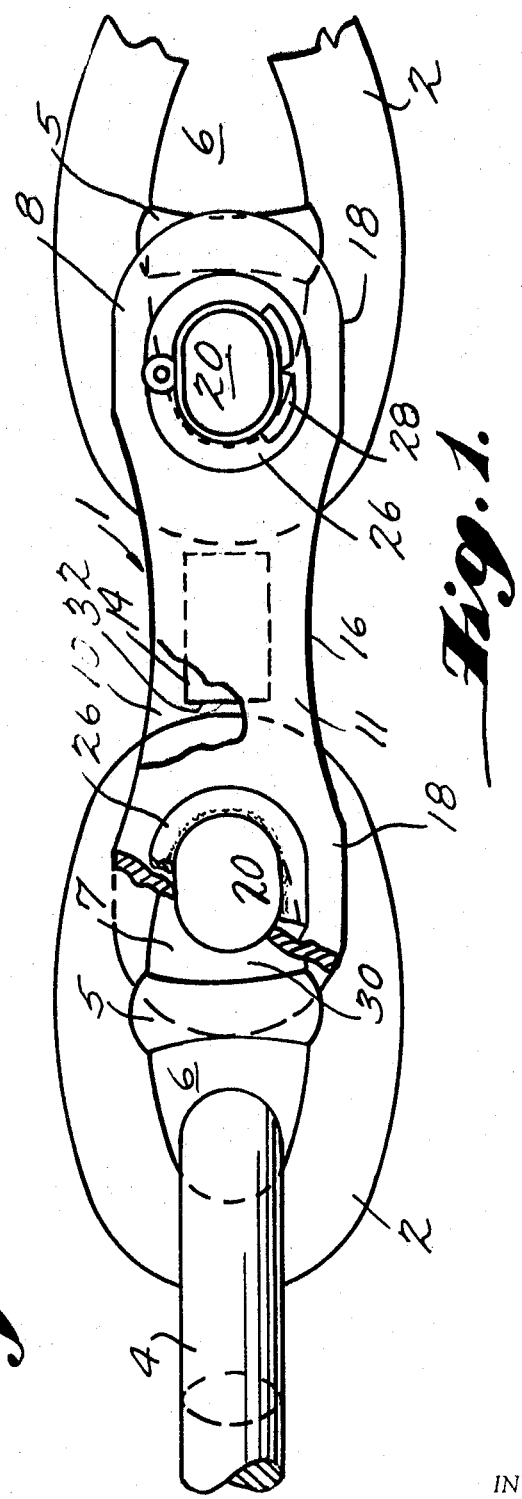

CHAIN CONNECTING LINK

BACKGROUND OF THE INVENTION

Presently there are many situations in which long lengths of high strength chain are required. One of the more common of these situations arises in marine applications when it is required to anchor or moor vessels in deep water. An example of this type of situation arises where off-shore drilling and production of oil are performed from floating platforms anchored in water of a depth in excess of 1,200 feet.

In off-shore drilling operations, chains are required which are of sufficient strength to anchor or hold enormous drilling barges in position over a well. It has been found that due to the cyclic stressing of anchor chains by forces of large magnitude caused by the movement of the barge on the surface due to wind, tide and sea surface conditions and presence of these chains in highly corrosive sea water, chains of an enormous size are required. For example, chains with links which are 28½ inches long with a wire diameter of 4¾ inches and with a break strength in excess of 2,000,000 pounds have been used. There is ample reason to assume that chains of much larger size and strength will be required as drilling is extended to even deeper water.

In these high stress drilling situations a stud-link chain is commonly used because of its superior strength over open link chains. These chains are called stud-link chains because they have a cross-bar or stud spanning the link's central opening and dividing it into two separate apertures to prevent the links of chains from kinking or tangling during use and to hold the sides of the link apart when the link is subjected to high stresses. If the stud should become damaged, the working strength of the link is greatly reduced so that it is important to protect the studs from damage.

These large chains are normally sold in 90 feet lengths, because their enormous size and weight make them difficult and impractical to handle and transport in longer lengths, so that, once these lengths of chain have been transported to their place of use, it is necessary to connect the separate lengths of chain together to form a continuous length of chain. It is also necessary to connect the separate lengths of chain together should the chains become broken during use. There are also other situations where it is necessary to attach other appendages to stud-link chain such as lengths of conventional chain, rings, hooks, eyes, swivels, shackles, turnbuckles, anchors, and the like.

Many prior devices have been used to attempt to perform the connection functions listed above, but each prior device has failed to satisfy one or more of the following requirements:

1. The connecting link must be of a strength at least equal to or greater than that required for the individual links of chain and be able to retain its strength in corrosive environments like sea water.

2. The link must be easy to attach and detach so that they do not require special tools and large amounts of time or labor.

3. The connecting link must be of a size and shape to connect to the smaller aperture of cross-bar link chain and not weaken, damage or dislodge the stud therein.

It is therefore the primary object of the present invention to provide a special connecting link for stud-link chain which not only satisfies the above-listed requirements but also is simple and inexpensive to manufacture and use.

SUMMARY OF THE INVENTION

To satisfy the requirements for a connecting link for use with stud-link chain, the present invention is provided with two slots of a sufficient width to allow a common end link of a length of stud-link chain to be inserted vertically into each slot. Two pins are removably mounted in the connecting link for connecting the stud-link chain. These two pins have been made with an elliptical shaped cross section so that they will fit through the small aperture in the stud-link chain while providing a higher load bearing strength than the largest circular pin which would fit through the aperture in a stud-link. Stop means are provided on the connecting link to limit the movement of the stud-link chain into the connecting link and thus prevent contact between these pins and the studs in the end chain links.

BRIEF DESCRIPTION OF THE DRAWINGS

FIG. 1 is an elevational view (partly in section) of the preferred embodiment of the present invention, connecting two lengths of stud-link chain.

FIG. 2 is a plan view of the embodiment shown in FIG. 1.

DETAILED DESCRIPTION

Referring now to the drawings, a connecting link assembly 1 is shown connecting two lengths of stud-link chain with end links 2. These end links 2 are the same size and shape as the other links of chain 4 and have studs 5 welded in place across their central opening dividing them into two separate apertures 6 and 7.

The body portion 8 of the connecting link assembly 1 is shown as being constructed with two identical side members 10 and 11, each having enlarged end portions 18 and a central reduced portion 16.

A block-shaped joining member 14 is welded at 12 between the central reduced portions 16 of the two side members 10 and 11 so that they are held in an aligned, spaced parallel relationship as shown in FIG. 2 and form slots 13 and 15 which are of sufficient width to allow a link of chain to be inserted as shown in FIG. 2. Although, in the preferred embodiment, the joining member 14 is welded in position, it is contemplated that other methods of attaching could be used such as fastening the member by threaded bolts.

Each enlarged end 18 of side members 10 and 11 have bores 24 and 25 respectively, extending completely through each side member. The bores 24 and 25 in the two side members 10 and 11 are axially aligned so that a pin may be inserted through both bores as shown in FIG. 1. Although in the preferred embodiment of the present invention the bores 24 are shown as being of a shape which would accommodate a pin of elliptical cross section, other bore shapes could be used which would accommodate pins of corresponding cross section.

Pins with non-circular cross sections have been used in the present invention primarily for the following reasons. First, the non-circular cross section pins limit the rotation of the link about the pin and thus prevents the link from rotating to positions which are not in alignment with the connecting link. Second, the non-circular cross-pins can be made with a larger cross-sectional area and thus have a higher shear strength and resistance to bending than the largest circular pin which would fit through the aperture of the stud-link chain. The pins 20 are shown as being of an elliptical cross section and having heads 22 which act as a stop to limit the axial movement of the pins 20 when they are inserted into the bores 24 and 25.

To use the present invention, two end links 2 are inserted into the slots 13 and 15 as shown in FIG. 2. The pins 20 are then inserted through the bores 24 in side member 10, through chain apertures 7, and then through the bores 25 in side member 11 until the head 22 contacts the outside surface of the side member 10. A suitable washer 26 is then inserted over the end of the pins 20. This washer can be welded to the pins 20 as shown at 27, or a cotter pin 28 or other suitable means used to keep the pins 20 from axially sliding from the bores 24 and 25.

In FIG. 1, it can be seen the pin 20 does not completely fill the chain aperture 6 and that there is a space 30 between the pin 20 and the stud 5. It can also be seen that the link 2 is free to move into the slot 13 until it strikes the joining means at 32. It is this cooperation of the joining means 14 with the chain link 2 which limits the movement of link 2 into the assembly 1 to prevent the pin 20 from contacting the stud 5.

Although in the preferred embodiment, the connecting link is shown connecting two lengths of stud-link chain, it could also be used to attach other appendages to the end of a length of studnlink chain such as lengths of conventional chain, anchors, hooks, rings and the like.

It is believed that the invention and many of its attendant advantages can be clearly understood from the foregoing description and it is obvious that various changes may be made in the construction and arrangement of the elements without altering the spirit of the present invention.

I claim:

1. A chain having a plurality of links including at least one common link having a central opening and a stud member dividing said central opening into a first and a second aperture, and a connecting link comprising a body portion, a pin member removably mounted in said body portion and inserted through one of said apertures of said common link for attaching said common link to said body portion, said pin member having a preselected length and a non-circular cross section along said length, the maximum width of which is greatest in the direction of a force applied along said chain's length so that said pin member has its highest resistance to bending in the direction of the applied force, said body portion having an abutment surface both for limiting linear movement of said common link with respect to said body portion so that said stud member will be maintained out of contact with said pin member and for limiting, in combination with said cross sectional width of said pin member, relative rotational movement between said common link and said pin member, means on said body portion for attaching articles thereto.

2. The combination as described in claim 1 wherein said pin member has an elliptical cross section.

3. The chain as claimed in claim 1 wherein said body portion has opposite ends and said pin member is removably mounted in one of said ends, and said means for attaching articles to said body portion includes a second pin member removably mounted in the other of said ends of said body portion.

4. The combination as claimed in claim 3 wherein said second pin member has a preselected length and a non-circular cross section along its said length, the maximum width of which is greatest in the direction of a force applied along said chain's length so that said second pin member has its highest resistance to bending in the direction of the applied force.

5. The combination as described in claim 4 wherein said pin members have an elliptical cross section.

6. The combination as claimed in claim 4 wherein said body portion comprises a first and a second side member, joining means located between said ends and rigidly joining said side members in a fixed spaced relationship, said side members having a bore adjacent each of said ends, said bores being axially aligned, said bores having cross sections complementary to the said cross sections of said pin members and said pin members being located in said bores and axially slidable with respect thereto, means for limiting the axial movement of said pins in said bores.

* * * * *